United States Patent
Kovacic et al.

(10) Patent No.: US 11,663,435 B2
(45) Date of Patent: May 30, 2023

(54) METHOD OF MONITORING AND CONTROLLING A LEVEL OF POWER TRANSMITTED BY AN ANTENNA OF A CONTACTLESS COMMUNICATION DEVICE

(71) Applicants: STMicroelectronics (Rousset) SAS, Rousset (FR); STMicroelectronics razvoj polprevodnikov d.o.o., Ljubljana (SI)

(72) Inventors: Kosta Kovacic, Orehova vas (SI); Alexandre Tramoni, Le Beausset (FR)

(73) Assignees: STMicroelectronics (Rousset) SAS, Agrate Brianza (IT); STMicroeleclroncs Razvoj Polprevodnikov D.O.O., Ljublijana (SI)

( * ) Notice: Subject to any disclaimer, the term of this patent is extended or adjusted under 35 U.S.C. 154(b) by 0 days.

(21) Appl. No.: 17/096,480

(22) Filed: Nov. 12, 2020

(65) Prior Publication Data

US 2021/0158120 A1 May 27, 2021

(30) Foreign Application Priority Data

Nov. 26, 2019 (EP) .................... 19315147

(51) Int. Cl.
*G06K 19/07* (2006.01)
*G06K 19/00* (2006.01)
(Continued)

(52) U.S. Cl.
CPC ....... *G06K 19/0701* (2013.01); *G06K 7/0008* (2013.01); *H02J 50/80* (2016.02); *H04B 5/0037* (2013.01)

(58) Field of Classification Search
CPC ........ G06K 19/07775; G06K 19/0701; G06K 7/08; G06K 7/10178; G06K 7/10366; G06K 7/10009; G06K 7/0008; G06K 19/07749; H04B 5/0037; H04B 5/0075; H04B 5/0012; H04B 17/103; H04B 5/0056; H04B 5/02;
(Continued)

(56) References Cited

U.S. PATENT DOCUMENTS

| 9,870,660 B1* | 1/2018 | Patterson ................. G07C 9/28 |
| 2013/0222119 A1* | 8/2013 | Tietke ................ G06K 7/10128 340/10.5 |

(Continued)

OTHER PUBLICATIONS

"Chip_impedance_characterization_for_contactless_proximity_personal_cards" (Year: 2010).*

(Continued)

*Primary Examiner* — Thien T Mai
(74) *Attorney, Agent, or Firm* — Slater Matsil, LLP (57) ABSTRACT

In an embodiment a method for dynamic power control of a power level transmitted by an antenna of a contactless reader is disclosed. The method may include supplying a power to the antenna and performing at least one power adjusting cycle for adjusting a power level during a contactless transaction with a transponder, each power adjusting cycle including modifying the power supplied to the antenna to a predetermined level of power, performing a first measuring of a loading effect on the antenna at the predetermined level of power and adjusting the power level according to the measured loading effect.

19 Claims, 3 Drawing Sheets

(51) Int. Cl.
*H02J 50/80* (2016.01)
*G06K 7/00* (2006.01)
*H04B 5/00* (2006.01)

(58) Field of Classification Search
CPC ........ H04B 5/0081; H02J 50/80; H02J 50/12; H02J 50/10; H02J 7/025
See application file for complete search history.

(56) References Cited

U.S. PATENT DOCUMENTS

2014/0103734 A1    4/2014  Walsh et al.
2017/0104468 A1*  4/2017  Kormann ................ H03H 7/38

OTHER PUBLICATIONS

"Measurement of Localized Specific Absorption Rate (SAR) for Contactless Smartcard Readers Operating in the HF Band" (Year: 1998).*

* cited by examiner

METHOD OF MONITORING AND CONTROLLING A LEVEL OF POWER TRANSMITTED BY AN ANTENNA OF A CONTACTLESS COMMUNICATION DEVICE

CROSS-REFERENCE TO RELATED APPLICATIONS

This application claims the benefit of European Patent Office Application No. 19315147.9, filed on Nov. 26, 2019, which application is hereby incorporated herein by reference.

TECHNICAL FIELD

Implementations and embodiments of the invention relate to wireless or contactless communication, especially to near field communication (NFC), and more particularly to monitoring and controlling a level of power transmitted by an antenna of a contactless communication device.

BACKGROUND

The acronym NFC designates a high frequency, short distance wireless communication technology, which makes the exchange of data possible between two contactless devices over a short distance, e.g., 10 cm.

NFC technology is standardized in documents ISO/IEC 18 092, ISO/IEC 21 481 and NFC FORUM but incorporates a variety of pre-existing standards including Type A and Type B protocols of the standard ISO/IEC 14 443.

An NFC device is a device compatible with NFC technology.

An NFC device may generally be used either in "reader" mode or in "card" mode for communicating with another contactless device, e.g., by using a contactless communication protocol such as the Type A protocol of the standard ISO/IEC 14 443.

In the "reader" mode, the NFC device acts as a reader with respect to the external contactless device which may then be a card or a label. In the reader mode, the NFC device may then read the contents of the external device and write information to the external device.

In the "card" mode, the NFC device then behaves as a transponder, e.g., a card or a label, and communicates with the external device which this time is a reader.

The past few years, the antenna size of the NFC devices has been reduced. Thus, high power NFC devices have been developed to obtain good performances with smaller antenna. In particular, with higher power, it is possible to obtain similar performances compared with lower power NFC devices using a larger area antenna.

Besides, for reasons of interoperability, contactless communication standards, e.g., the NFC FORUM standard, require that the transfer of power between a reader and a transponder falls within a certain power range defined between a minimum and a maximum field strength.

Due to the increased output power of the high-power NFC readers, it has become necessary to implement a power reduction at close distance.

However, known solutions of high-power NFC readers are not adapted to respect the maximum field strength specification, especially at close distances.

Moreover, the NFC reader and the transponder can move relative to each other in an operating distance also during a transaction. Thus, it is desirable to be able to adapt the power continuously.

The known NFC readers are not configured to adapt the output power during the full transaction.

SUMMARY

Embodiments provide a method of controlling during a full transaction the level of power transmitted by an antenna of a contactless communication device, and more particularly of an NFC reader.

Further embodiments provide a method of dynamic power control of the level of power transmitted by an antenna of a contactless reader device, such as an NFC device, the method comprising supplying a power to the antenna, performing at least one power adjusting cycle for adjusting the power level supplied to the antenna during a contactless communication transaction with a transponder, each power adjusting cycle comprising a modifying step including modifying the power supplied to the antenna to a predetermined level of power, a first measuring step including measuring a loading effect, named absolute loading effect, on the antenna at said predetermined level of power; then an adjusting step including adjusting the power according to the measured absolute loading effect.

The contactless reader device can be compatible with NFC technology.

The contactless reader device is provided to transmit a power to communicate with another contactless communication device also named transponder on the following.

The measured loading effect can be representative to the distance between the contactless reader device and the transponder at a time in the transaction.

This method makes it possible to adjust the power transmitted by the antenna of the contactless reader device during a full transaction between the contactless reader device and the transponder.

More particularly, in the method according to this aspect, there is a reduced risk and eventually no risk to exceed the maximum field strength specification, even at close distances and even while the transponder is moving, since the level of power supplied to the antenna can be continuously adapted specifically to the actual distance of the transponder during the transaction.

More particularly, the method comprises a plurality of power adjusting cycles.

Advantageously, a measurement of the loading effect of the antenna at different distances from a transponder at said predetermined level of power is performed during the manufacturing of the contactless reader device to calibrate the contactless reader device.

As the loading effect is only measured at the predetermined level of power, there is no need during the manufacturing of the contactless reader device to measure the loading effect for different power levels.

Thus, the manufacturing time of the contactless reader device is relatively fast.

According to a particularly advantageous implementation, the method comprises at least one detecting step including detecting a change of loading effect of the antenna, each detecting step being followed by a power adjusting cycle if a change of loading effect is detected.

Thus, a power adjusting cycle is executed only when a change of the loading effect is detected, which is representative to a change of the distance between the contactless reader device and the transponder.

Indeed, it is not necessary to execute a power adjusting cycle when no change of loading effect is detected as there is no need to modify the power level when the distance between the contactless reader device and the transponder is kept the same.

Besides, the method can comprise at least a data transmission step followed by a data reception step.

Advantageously, each detecting step is executed at well-defined time points during the complete transaction.

Thus, according to a particularly advantageous implementation, the said detecting step is executed before each step of data transmission.

As a variant, the said detecting step is executed after each step of data reception.

According to a particularly advantageous embodiment, the said detecting step comprises a second measuring step including measuring a loading effect, named relative loading effect, on the antenna supplied by the adjusted power level and comparing the measured relative loading effect to relative loading effect limits to determine whether the measured relative loading effect is inside or outside the relative loading effect limits, and detecting a change of loading effect if the measured relative loading effect is outside the relative loading effect limits.

If the measured relative loading effect is inside the relative loading effect limits no change of loading effect is detected.

More particularly, the loading effect measurement is performed by analyzing the amplitude and/or the phase of the generated magnetic field. In particular, the amplitude and/or the phase can be measured by a circuit as disclosed in the European patent application filed under n° 18.213835.4.

As mentioned above, when a change of loading effect is detected, a power adjusting cycle is performed.

According to a particularly advantageous embodiment, each power adjusting cycle comprises said modifying step, absolute loading effect limits being predefined for said predetermined level of power, then said first measuring step, and comparing the absolute loading effect to absolute loading effect limits to determine whether the absolute loading effect is inside or outside the absolute loading effect limits.

If the absolute loading effect is inside the absolute loading effect limits, absolute loading effect limits are defined as relative loading effect limits.

If said absolute loading effect is outside the absolute loading effect limits, the power adjusting cycle comprises said adjusting step, then measuring a loading effect, named new relative loading effect, of the antenna, then defining said relative loading effect limits from the new relative loading effect.

More particularly, the power supplied to the antenna can be controlled as described in the French patent application published under the n° 3067534.

According to a particularly advantageous implementation, the method comprises performing a power adjusting cycle when the supplying of the antenna starts.

In particular, the supplying of the antenna starts when the transaction is initialized.

According to a particularly advantageous embodiment, said predetermined level of power is a predefined maximum level of power relative to the contactless transaction. Preferably, said maximum level of power is between 2 W and 3 W.

Measuring the absolute loading effect at a maximum level of power allows avoiding to lose the connection with the transponder.

According to another aspect, a contactless communication device is provided, the contactless communication device being configured to implement the aforementioned method.

More particularly, the contactless reader device comprises an antenna and a dynamic power control circuit, the contactless reader device being intended to perform a contactless transaction with a transponder, wherein the dynamic power control circuit is configured to supply a power to the antenna, and to perform at least one power adjusting cycle for adjusting the power level supplied to the antenna during a contactless transaction, the power adjusting cycle comprising a modifying step including modifying the power supplied to the antenna to a predetermined level of power, first measuring step including measuring a loading effect, named absolute loading effect, on the antenna at said predetermined level of power and then adjusting step including adjusting the power according to the measured absolute loading effect.

According to a particularly advantageous embodiment, said dynamic power control circuit is also configured to perform at least one detecting step including detecting a change of loading effect of the antenna, each detecting step being followed by a power adjusting cycle if a change of loading effect is detected.

The contactless reader device is intended to perform said transaction comprising at least a data transmission step followed by a data reception step.

Preferably, the dynamic power control circuit is configured to execute the said detecting step before each data transmission step.

As a variant, the dynamic power control circuit is configured to execute the said detecting step after each data reception step.

According to a particularly advantageous embodiment, the dynamic power control circuit is configured to perform the said detecting step which comprises a second measuring step including measuring a loading effect, named relative loading effect, on the antenna supplied by the adjusted power level and comparing the measured relative loading effect to relative loading effect limits to determine whether the measured relative loading effect is inside or outside the relative loading effect limits, and detecting a change of loading effect if the measured relative loading effect is outside the relative loading effect limits.

Advantageously, the dynamic power control circuit is configured to perform each power adjusting cycle which comprises said modifying step, absolute loading effect limits being predefined for said predetermined level of power, then said first measuring step and comparing the absolute loading effect to absolute loading effect limits to determine whether the absolute loading effect is inside or outside the absolute loading effect limits, If the absolute loading effect is inside the absolute loading effect limits, absolute loading effect limits are defined as relative loading effect limits, If said absolute loading effect is outside the absolute loading effect limits, the power adjusting cycle comprises adjusting the power to a power level determined from said absolute loading effect, then measuring a loading effect, named new relative loading effect, of the antenna, then defining said relative loading effect limits from the new relative loading effect.

Preferably, the dynamic power control circuit is configured to perform a power adjusting cycle when the supplying of the antenna starts.

Advantageously, said predetermined level of power is a predefined maximum level of power relative to the contactless transaction.

BRIEF DESCRIPTION OF THE DRAWINGS

Other advantages and features of the invention will appear in the detailed description of embodiments and implementations, in no way restrictive, and the attached drawings in which.

DETAILED DESCRIPTION OF ILLUSTRATIVE EMBODIMENTS

Figure 1:
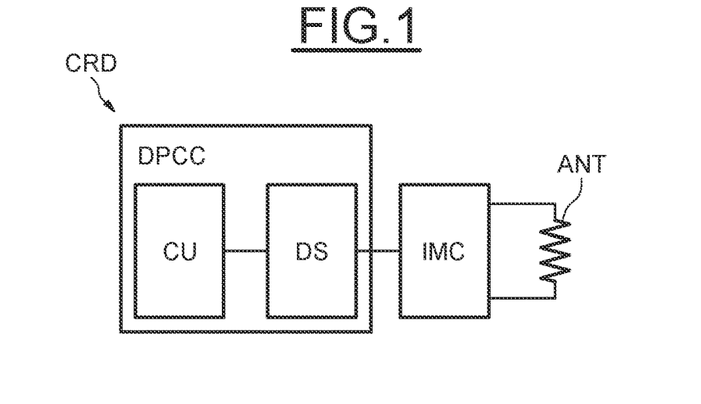
FIGS. 1-5 schematically illustrate various implementations and embodiments.

FIG. 1 shows an embodiment of a contactless reader device according to embodiments.

The contactless reader device CRD comprises an antenna ANT and a dynamic power control circuit DPCC.

The dynamic power control circuit DPCC is used to control the level of power supplied to the antenna ANT.

The dynamic power control circuit DPCC comprises a control unit CU and a driving stage DS for driving the antenna ANT.

The control unit CU can be a microcontroller.

The driving stage is connected to the terminals of the antenna ANT via an impedance matching circuit IMC, making it possible for a current with a carrier frequency considered (e.g., 13.56 MHz) to be made to flow in the antenna ANT so as to generate the electromagnetic field.

The driving stage DS and the impedance matching circuit IMC can be the ones disclosed in the French patent application published under the n° 3067534, for example.

The contactless reader device CRD can be compatible with NFC technology. In this case, the contactless reader device is an NFC device.

The contactless reader device CRD is configured to perform transactions with a transponder (not shown in FIG. 1). The transponder may be passive or active.

A passive transponder performs a load modulation of the magnetic field generated by the reader.

An active transponder uses an active load modulation (also known to the person skilled in the art under its acronym ALM) for transmitting information to the reader. The transponder also generates a magnetic field via its antenna which simulates the load modulation of the field of the reader performed by a passive transponder.

Active transponders may be specific devices, e.g., contactless smart cards, integrated circuit (IC) cards, labels or badges, or contactless devices or components emulated in card mode, here again, for example, incorporated into host apparatuses such as, for example, mobile cellular phones or tablets.

The dynamic power control circuit DPCC of the contactless reader device is configured to implement, for example, by using software modules, a method of dynamic power control.

The method of dynamic power control is used to adjust the level of power supplied to the antenna ANT according to the distance between the contactless reader device and a transponder during a transaction between them. In this method, loading effects are measured on the antenna ANT, the loading effect being representative to the distance between the contactless reader device and the transponder at a time in the transaction.

More particularly, the loading effect measurement is performed by analyzing the amplitude and/or the phase of the generated magnetic field. In particular, the amplitude and/or the phase can be measured by a circuit as disclosed in the European patent application filed under n° 18.213835.4.

In this case, the circuit comprises an In-phase Quadrature down converter capable of being coupled to the antenna of the contactless reader device, DC cancellation circuits coupled at outputs of said converter, and a circuitry for analyzing de signals outputted by said DC cancellation circuits to determine the loading effect.

In particular, DC cancellation circuits are configured by said circuitry based on de levels measured when no other transponder is present in the field generated by the contactless reader device.

DC cancellation circuits are used to reduce the de offset on the signals provided by the In-phase Quadrature down converter to provide a level which correspond to the actual phase and amplitude of the magnetic field.

Figure 2:
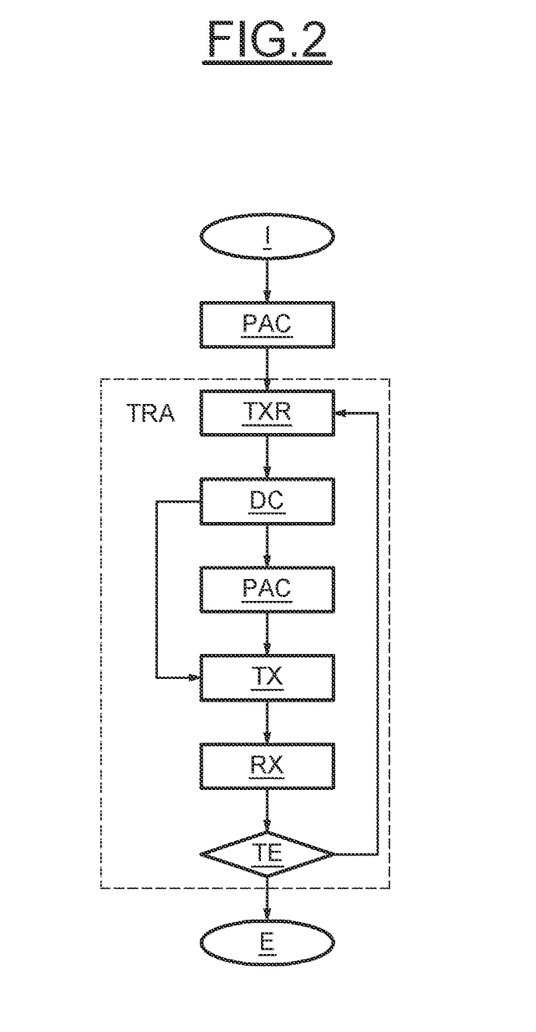

FIG. 2 shows an example of an implementation of such method of dynamic power control.

At step I, the driving of the antenna ANT is initialized before starting the transaction TRA.

The power supply of the antenna ANT starts with a first power adjusting cycle PAC.

Figure 3:
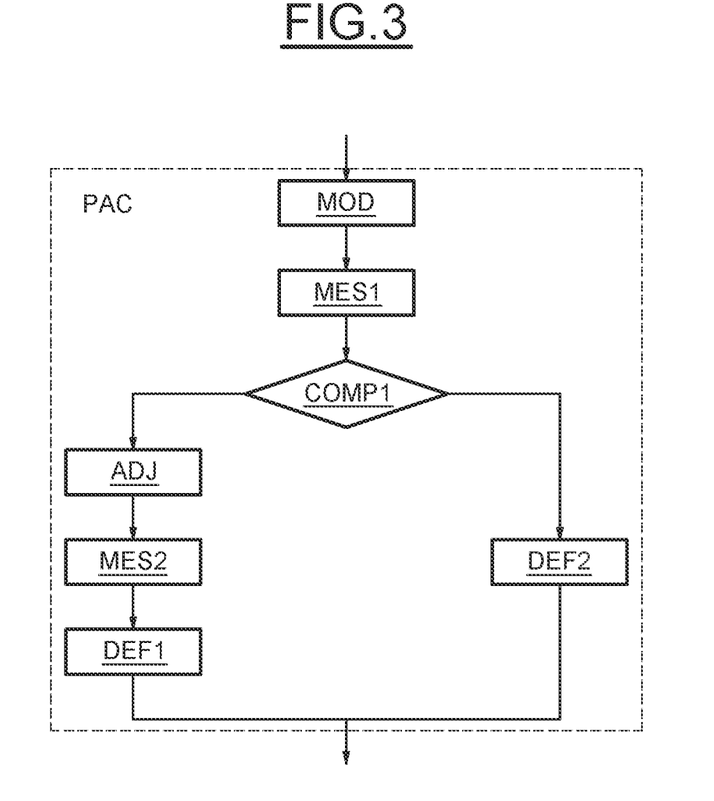

A detailed power adjusting cycle PAC is illustrated on FIG. 3.

The first power adjusting cycle PAC comprises a modifying step MOD including modifying the power to a predetermined level of power by the dynamic power control circuit DPCC. As the dynamic power control circuit DPCC starts supplying the power to the antenna ANT with the first power adjusting cycle PAC, the level of power delivered to the antenna ANT is modified from no power to the said predetermined level of power.

Absolute loading effect limits are predefined for this predetermined level of power. In particular, absolute loading effect limits are defined during the manufacturing by measuring a loading effect at said predetermined level of power.

Then, the dynamic power control circuit DPCC performs a first measuring step including measuring a loading effect, named absolute loading effect. The absolute loading effect is measured at said predetermined level of power.

Then, the dynamic power control circuit DPCC performs a step COMP1 in which the dynamic power control circuit DPCC compares the measured absolute loading effect to the absolute loading effect limits. From this comparison, the dynamic power control circuit DPCC determines whether the measured absolute loading effect is inside or outside the absolute loading effect limits.

If the measured absolute loading effect is outside the absolute loading effect limits, the next step implemented by the dynamic power control circuit DPCC is an adjusting step ADJ.

If the measured absolute loading effect is inside the absolute loading effect limits, the next step implemented by the dynamic power control circuit DPCC is a step DEF2.

At step ADJ, the dynamic power control circuit DPCC adjusts the power to a power level determined from the measured absolute loading effect.

More particularly, a lookup table is used with the measured absolute loading effect to determine the adjusted power level. The lookup table is built during the manufacturing of the contactless reader device measurement. In particular, loading effects of the antenna ANT at different distances from a transponder are measured at said predetermined level of power and adjusting levels of power are defined for each measured loading effect. The lookup table is stored in a memory of the contactless reader device or in a software stack in charge of managing the contactless reader.

Then, the dynamic power control circuit DPCC performs a measuring step MES2 in which the dynamic power control circuit DPCC measures a loading effect.

Next, the dynamic power control circuit DPCC performs a step DEF1 in which relative loading effect limits are defined from the loading effect measured at step MES2.

Besides, when the measured absolute loading effect is determined as being inside the absolute loading effect limits at step COMP1, the dynamic power control circuit DPCC performs the step DEF2. At step DEF2, the dynamic power control circuit DPCC defines the absolute loading effect limits as relative loading effect limits.

The power adjusting cycle PAC ends at the end of the step DEF1 or the step DEF2.

Thus, the first power adjusting cycle PAC is used to adjust the power supplied to the antenna ANT before starting the transaction. The first power adjusting cycle PAC also ensures that any transponder already placed within reach of the contactless reader device, will not receive too much power.

The first power adjusting cycle PAC is also used to define relative loading effect limits.

After the first power adjusting cycle PAC, the transaction starts at step TXR in which the dynamic power control circuit DPCC waits for a first transmission request.

When the transmission request is received by the dynamic power control circuit DPCC, the dynamic power control circuit DPCC performs a detecting step DC including detecting a change of loading effect of the antenna ANT.

Figure 4:
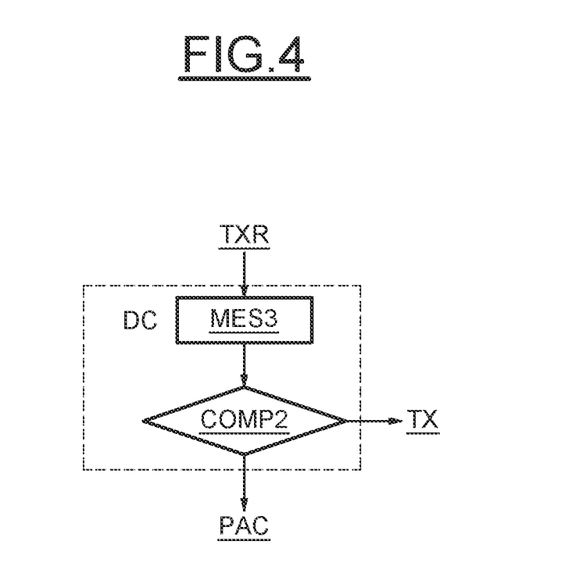

The step DC is detailed on FIG. 4.

The step DC starts with a measuring step MES3 performed by the dynamic power control circuit DPCC. At step MES3, the dynamic power control circuit DPCC measures a loading effect, named relative loading effect, on the antenna ANT.

Then, a step COMP2 is performed by the dynamic power control circuit DPCC. At step COMP2, the dynamic power control circuit DPCC compares the relative loading effect measured at step MES3 to relative loading effect limits defined on the last power adjusting cycle PAC. From this comparison, the dynamic power control circuit DPCC determines whether the measured relative loading effect is inside or outside the relative loading effect limits.

If the measured relative loading effect is inside the relative loading effect limits, no change of loading effect is detected. That indicates that the relative position between the contactless reader and the transponder has not changed. Therefore, the data transmission can start directly without modifying the level of power supplied to the antenna ANT.

If the measured relative loading effect is outside the relative loading effect limits, a change of loading effect is detected. The change of loading effect indicates that the distance between the contactless reader and the transponder has changed since the last power adjusting cycle. Thus, to adapt the power supplied to the antenna ANT to this new distance, a new power adjusting cycle is performed by the dynamic power control circuit DPCC.

The power adjusting cycle is performed as mentioned above for the first power adjusting cycle.

In particular, at step MOD, the level of power supplied to the antenna ANT is modified from the level of power adjusted in the last power adjusting cycle to the predetermined level of power.

At step MES2, the dynamic power control circuit DPCC measures a new loading effect, named new relative loading effect.

At step DEF1, the power control circuit updates the relative loading effect limits from the new relative loading effect.

At the end of the power adjusting cycle, the level of power supplied to the antenna ANT is adapted for a data transmission from the contactless reader device to the transponder.

Thus, the data transmission is performed at step TX.

Next, a step RX is performed in which the contactless reader device receives data from the transponder following the previous data transmission.

Next, at step TE, the dynamic power control circuit DPCC checks whether the transaction is finished.

If the transaction is finished, the dynamic power control circuit DPCC stops supplying power to the antenna ANT at step E.

If the transaction is not finished yet, the aforementioned steps are performed again from step TXR in which the dynamic power control circuit DPCC waits for the next transmission request.

Such method of dynamic power control makes it possible to adjust the power transmitted by the antenna ANT of the contactless reader device during a full transaction between the contactless reader device and the transponder.

More particularly, there is no risk to exceed the maximum field strength specification, even at close distances and even while the transponder is moving, since the level of power supplied to the antenna ANT can be continuously adapted specifically to the actual distance of the transponder during the transaction.

Besides, as the power is adjusted from a measured loading effect which is only measured at the predetermined level of power, there is no need during the manufacturing of the contactless reader device to build a lookup table for different power levels for adjusting the power.

Thus, the manufacturing time of the contactless reader device is relatively fast.

Preferably, said predetermined level of power used at step MOD of the power adjusting cycle PAC is a predefined maximum level of power relative to the contactless transaction. Preferably, said maximum level of power is between 2 W and 3 W. Measuring the absolute loading effect at a maximum level of power allows avoiding to lose the connection with the transponder.

Figure 5:
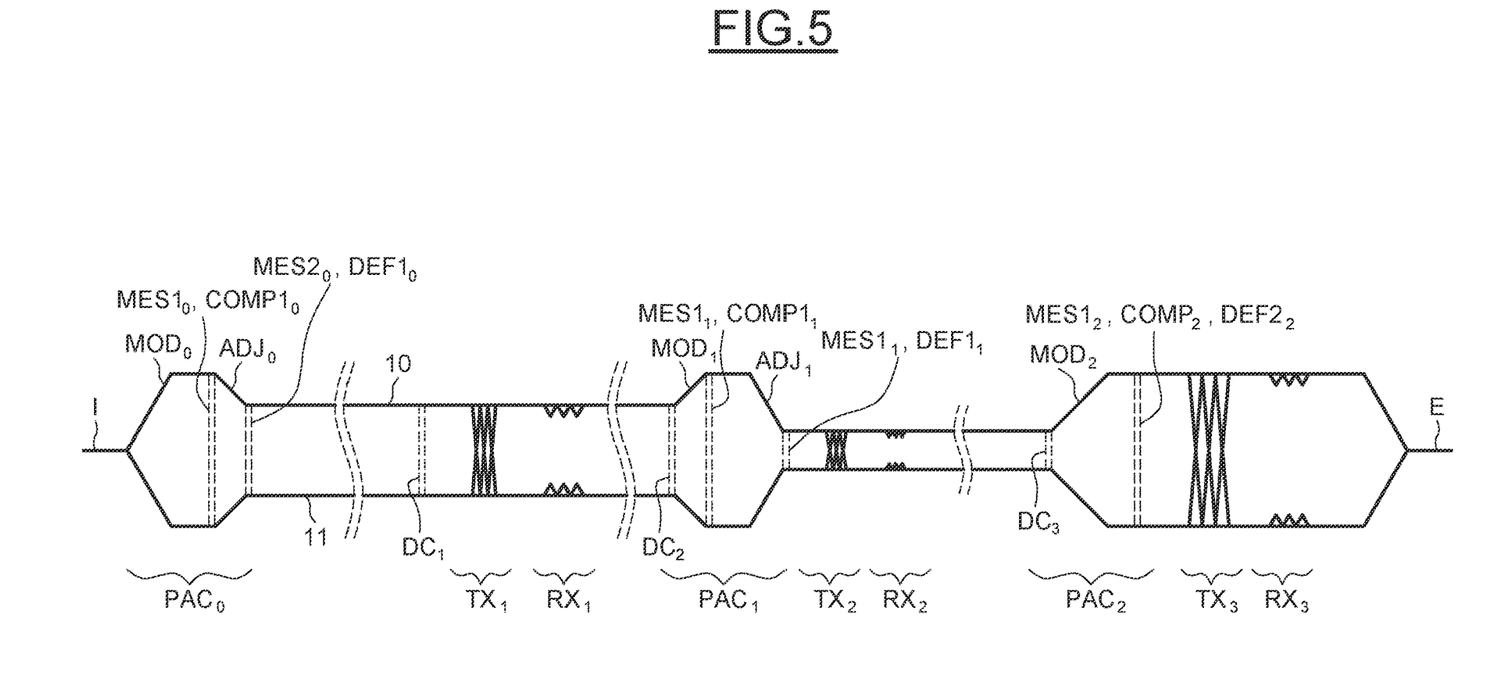

An example of an implementation of such method is illustrated on FIG. 5 on which the level of power supplied to the antenna ANT is represented by the two lines 10 and 11.

The driving of the antenna ANT is initialized before starting the transaction TRA at step I where no power is supplied to the antenna ANT yet.

Then, a first power adjusting cycle $PAC_o$ is performed. Firstly, the level of power supplied to the antenna ANT is increased until it reaches the predetermined level of power at step $MOD_o$.

Then, an absolute loading effect measurement is performed at step $MES1_o$. The measured absolute loading effect is compared to the absolute loading effect limits at step $COMP1_o$. As in this example the measured absolute loading effect is outside the absolute loading effect limits, the level of power is reduced at step $ADJ_o$ according to the measured absolute loading effect. Then, a loading effect is measured at step $MES2_o$ and relative loading effect limits are defined at step $DEF1_o$.

When a data transmission request is received by the dynamic power control circuit DPCC, a first step $DC_o$ of detecting a change of loading effect of the antenna ANT is performed. Thus, a relative loading effect is measured. As no change of loading effect is detected during the first step $DC_1$, the data transmission can be performed directly at step $TX_1$ without modifying the level of power supplied to the antenna ANT.

Next, data from the transponder are received at step $RX_1$.

As the transaction is not yet finished, the dynamic power control circuit DPCC waits for a new data transmission request. When, this new data transmission request is received, the dynamic power control circuit DPCC performs a new step $DC_2$ of detecting a change of loading effect of the antenna ANT. In this step $DC_2$, a change of loading effect is detected indicating that a relative position between the contactless reader device and the transponder has changed. Thus, a power adjusting cycle $PAC_1$ is performed after the step $DC_2$ to adjust the level of power supplied to the antenna ANT before the data transmission.

More particularly, the level of power supplied to the antenna ANT is increased until it reaches the predetermined level of power at step $MOD_1$.

Then, an absolute loading effect measurement is performed at step $MES1_1$. The measured absolute loading effect is compared to the absolute loading effect limits at step $COMP1_1$. As in this example the measured absolute loading effect is outside the absolute loading effect limits, the level of power is reduced at step $ADJ_1$ according to the measured absolute loading effect. Then, a loading effect is measured at step $MES2_1$ and relative loading effect limits are updated at step $DEF1_1$.

Next, the data transmission is performed at step $TX_2$ and data are received from the transponder at step $RX_2$.

As the transaction is not yet finished, the dynamic power control circuit DPCC waits for a new data transmission request. When, this new data transmission request is received, the dynamic power control circuit DPCC performs a new step $DC_3$ of detecting a change of loading effect of the antenna ANT. In this step $DC_3$, a change of loading effect is detected indicating that a relative position between the contactless reader device and the transponder has changed. Thus, a power adjusting cycle $PAC_2$ is performed after the step $DC_3$ to adjust the level of power supplied to the antenna ANT before the data transmission.

More particularly, the level of power supplied to the antenna ANT is increased until it reaches the predetermined level of power at step $MOD_2$.

Then, an absolute loading effect measurement is performed at step $MES1_2$. The measured absolute loading effect is compared to the absolute loading effect limits at step $COMP1_2$. As in this example the measured absolute loading effect is inside the absolute loading effect limits, the absolute loading effect limits are defined as relative loading effect limits at step $DEF2_2$. The level of power supplied to the antenna ANT is kept at the predetermined level of power.

Next, the data transmission is performed at step $TX_3$ and data are received from the transponder at step $RX_3$.

As the transaction is now finished, the dynamic power control circuit DPCC stops supplying power to the antenna ANT at step E.

What is claimed is:

1. A method for dynamic power control of a contactless reader, the method comprising:
supplying power to an antenna to a predetermined level of power, the power to the antenna being supplied for a contactless transaction between the contactless reader and a transponder;
performing a first measuring of a loading effect on the antenna at the predetermined level of power, wherein the loading effect represents a distance between the contactless reader and the transponder;
comparing the first measured loading effect against a first upper loading effect limit and a first lower loading effect limit;
adjusting the power level when the first measured loading effect is outside the first loading effect limits;
performing a second measuring of the loading effect on the antenna at the adjusted level of power; and
providing a second upper loading effect limit and a second lower loading effect limit based on the adjusted level of power.

2. The method according to claim 1, further comprising:
detecting a change of the loading effect on the antenna; and
subsequently adjusting the power level when a change of the loading effect outside the second loading effect limits is detected.

3. The method according to claim 2, further comprising:
transmitting data; and
receiving data after transmitting the data,
wherein detecting is executed before each data transmission.

4. The method according to claim 2, further comprising:
transmitting data; and
receiving data after transmitting the data,
wherein detecting is executed after each data reception.

5. The method according to claim 1, further comprising:
receiving a transmission request;
after receiving the transmission request, performing a third measuring of the loading effect on the antenna;
comparing the third measured loading effect to the second loading effect limits in order to determine whether the third measured loading effect is inside or outside the second loading effect limits; and
further adjusting the power level when the third measured loading effect is outside the second loading effect limits.

6. The method according to claim 1, wherein the predetermined level of power is a predefined maximum level of power relative to the contactless transaction between the contactless reader and the transponder.

7. The method according to claim 1, wherein the contactless reader is a near field communication (NFC) contactless reader.

8. A contactless reader comprising:
an antenna; and
a dynamic power control circuit configured to:
supply power to the antenna to a predetermined level of power;
perform a first measuring of a loading effect on the antenna at the predetermined level of power, wherein the loading effect represents a distance between the contactless reader and a transponder;
compare the first measured loading effect against a first upper loading effect limit and a first lower loading effect limit;
adjust the power level when the first measured loading effect is outside the first loading effect limits;
perform a second measuring of the loading effect on the antenna at the adjusted level of power; and
provide a second upper loading effect limit and a second lower loading effect limit based on the adjusted level of power,
wherein the contactless reader is configured to perform a contactless transaction with the transponder.

9. The contactless reader according to claim 8, wherein the dynamic power control circuit is further configured to:
  detect a change of the loading effect on the antenna; and
  subsequently adjust the power level when a change of the loading effect outside the second loading effect limits is detected.

10. The contactless reader according to claim 9, wherein the contactless transaction comprises a data transmission followed by a data reception, and wherein the dynamic power control circuit is configured to detect the change of the loading effect before the data transmission.

11. The contactless reader according to claim 9, wherein the contactless transaction comprises a data transmission followed by a data reception, and wherein the dynamic power control circuit is configured to detect the change of the loading effect after the data reception.

12. The contactless reader according to claim 8, wherein the dynamic power control circuit is further configured to:
  receive a transmission request;
  after receiving the transmission request, perform a third measuring of the loading effect on the antenna;
  compare the third measured loading effect to the second loading effect limits in order to determine whether the third measured loading effect is inside or outside the second loading effect limits; and
  further adjust the power level when the third measured loading effect is outside the second loading effect limits.

13. The contactless reader according to claim 8, wherein the predetermined level of power is a predefined maximum level of power relative to the contactless transaction.

14. The method according to claim 5, further comprising:
  providing a third upper loading effect limit and a third lower loading effect limit based on the further adjusted level of power.

15. The method according to claim 1, wherein the first loading effect limits are predefined during manufacturing.

16. The contactless reader according to claim 12, wherein the dynamic power control circuit is further configured to:
  provide a third upper loading effect limit and a third lower loading effect limit based on the further adjusted level of power.

17. A method for dynamic power control of a contactless reader, the method comprising:
  supplying power to an antenna to a predetermined level of power, the power to the antenna being supplied for a contactless transaction between the contactless reader and a transponder;
  performing a first measuring of a loading effect on the antenna at the predetermined level of power, wherein the loading effect represents a distance between the contactless reader and the transponder;
  comparing the first measured loading effect against a first upper loading effect limit and a first lower loading effect limit;
  in a first configuration:
    adjusting the power level when the first measured loading effect is outside the first loading effect limits;
    performing a second measuring of the loading effect on the antenna at the adjusted level of power; and
    providing a second upper loading effect limit and a second lower loading effect limit based on the adjusted level of power and defining them as relative loading effect limits; and
  in a second configuration:
    keeping the first loading effect limits when the first measured loading effect is within the first loading effect limits and defining them as the relative loading effect limits.

18. The method according to claim 17, further comprising:
  receiving a transmission request from the transponder;
  after receiving the transmission request, performing a third measuring of the loading effect on the antenna;
  comparing the third measured loading effect to the relative loading effect limits in order to determine whether the third measured loading effect is inside or outside the relative loading effect limits;
  in a first configuration, transmitting data to the transponder when the third measured loading effect is within the relative loading effect limits; and
  in a second configuration:
    further adjusting the power level when the third measured loading effect is outside the relative loading effect limits; and
    transmitting the data with the further adjusted power level.

19. The method according to claim 18, further comprising:
  receiving data from the transponder after transmitting the data; and
  stopping supplying the power to the antenna when the contactless transaction is finished.

* * * * *